6336X
No Printed Specification Available
W. Kendall,
Water Wheel,
Patented Jan. 12, 1831.
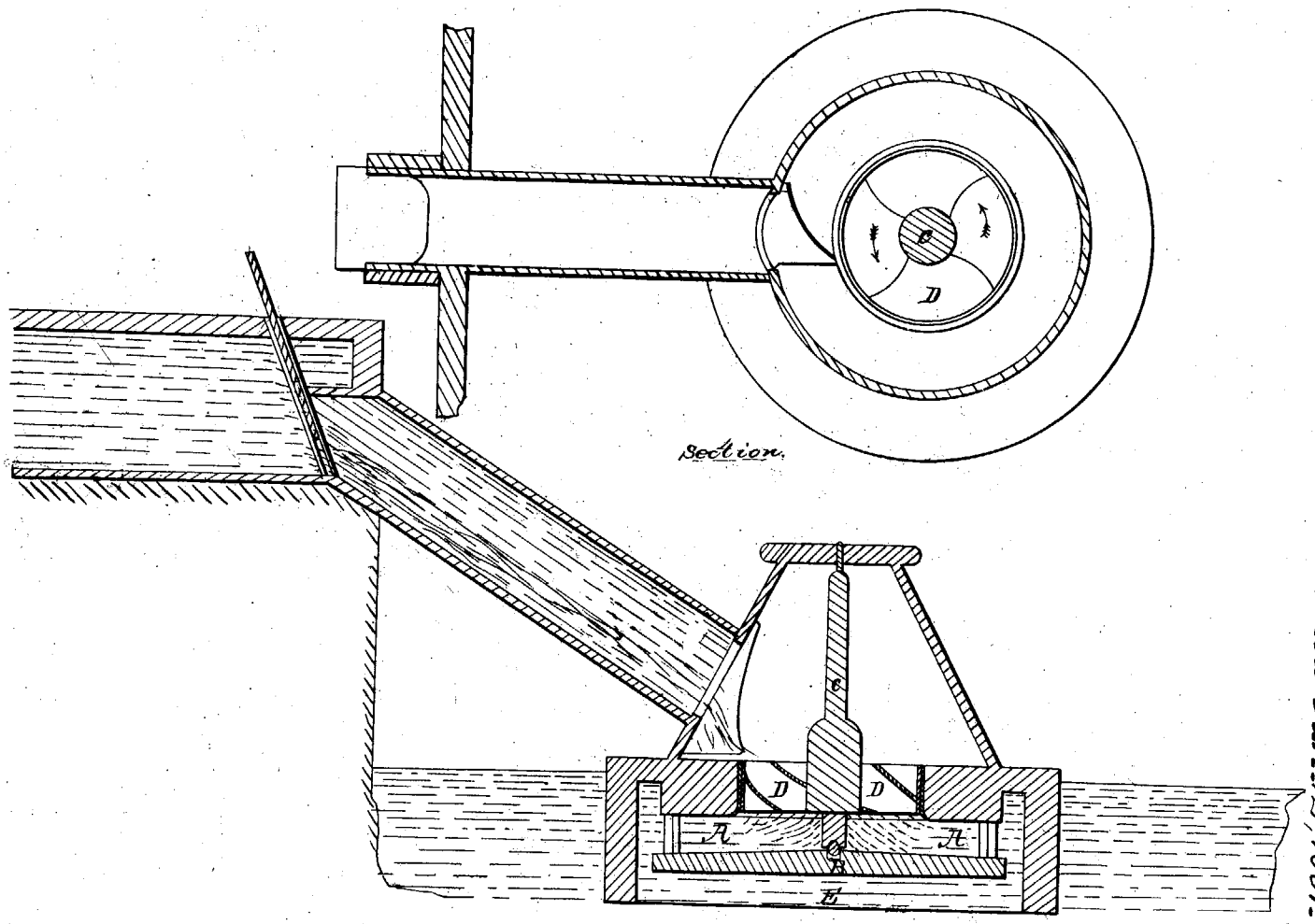
N. PETERS, PHOTO-LITHOGRAPHER, WASHINGTON, D. C.

Jan 12 1831

William Kendall Fairfield Maine.

Letters Patent. X 6336

The schedule referred to in these Letters Patent and making part of the same containing a description in the words of the said William Kendall himself of his improvement in the mode of applying Water to Mill wheels.

To all persons to whom these presents shall come. William Kendall of Fairfield in the County of Somerset and State of Maine, Millwright sends greeting. Be it known that I William Kendall, have made a new and useful discovery or invention in the application of water whilst acting upon Mill wheels which I call the syphon principle, that is after the water has performed the full measure of its first action upon the wheel by percussion, or rather by reaction; the water in passing the wheel has then acquired a velocity equal to that from a gate under the same heads the effects of this velocity of the water is still continued by this invention to act upon the same wheel by causing its force to be expended in removing the atmospheric pressure from the lower or opposite side of the oblique buckets and openings of the wheel, which pressure never exceeds, yet always is equal to the weight or head of water of 33⅓ feet, or fifteen pounds to the square inch; this pressure becomes proportionately diminished according to the head of water used; by causing the water from the wheel to pass off, between two plain surfaces, with a fixed space, a proper degree larger than this body of water in motion naturally occupy. this space becoming increased as it extends from the wheel, and does not require to be extended farther than to allow its outward measure of opening to be sufficient to discharge the quantity of water expended by the wheel at the rate of from two to six feet per second as the saving of water may require; this discharge in all cases must be laid below the surface of the water that the air may be prevented from entering within. this I call the draught of the wheel

X6336 wheel it acts as a syphon and will be better explained after explain
ing the common art or science as it stands at the present time. overshot
wheels or water acting by its gravity they have the advantage of producing
effects greater and greater, as we enlarge the wheel for holding & retaining
all the water until its motion becomes scarcely discernable yet it is not
in our power to obtain one third more in effects from them, than is obtained
by following the judicious rules, directed by Oliver Evans here their effects
are estimated at two thirds of the power applied, the requisite strength and
expense is proportionally increased, if we rise beyond this diminishing
one we increase the other in the same geomatrical progression.

The next case is where ~~one~~ half the velocity is multiplied by
three quarters of its greatest load, as water acting by percussion on under
shot wheels which are variously made, and in their most perfect form
their effects are rated at 1/3 of the power applied, here from an application
of your invention, by using thin buckets of about one third the width
of the acting column of water, and increasing the number in that ratio
their effect become increased; a suggestion of this principle as
applicable to steam boat wheels was published in 181[illegible], intending
for that purpose it should be given the advantage of from suction at the
backside of the buckets. But here I specify that from a reaction of water
not only from suction that may arise from a weight of water below
the wheel by placing it near the upper part of a confined penstock,
but from velocity or its force of percussion then applied, by my in-
vention which I claim. Reaction wheels are those which move by
reaction of the water, their effects have been estimated by the same
ratio as undershot wheels; This principle of reaction of fluids
was first noticed in Roman time, but only from one of their kettles
suspended having an oblique issue the rotary motion & notice was
given. At the site Dr. Barker applied it to mechanical purposes
from an issue at the end of a hollow arm; and after him applied
to a circular wheel to act under water by James Rumsey a citizen of the
U.S. by this the whole head can be used and many privileges for mills
obtained where no other wheel could be applied, yet this apparent
valuable

X6334 valuable principle actuated only by [illegible] is wholly abandoned
in the late edition of this work alleging that they (the wheels) have
not answered the expectations entertained of them &c. This was rea-
sonable and owing to the want of a proper system to construct the
wheels they have generally made so much waste of water in a
short time after built as their use required, much of this waste by
reason of the difficulty in connecting the main rim to the shaft this
with the changing position from the wearing of the gudgeon, the
unyielding of the wheel in other parts, causing its wearing rim to
wear away the space between it and the flume, making a waste
by every particle that is drawn within by the water, I have this part
to contend with in wheels of my construction, but the assurance that
the wheel will support a perfect circle and that this shimming is
smaller and in that part where the velocity of the water is great and
in contra direction to make waste or retain the particles to cause
its wearing away.

From all reaction wheels the quantity of water which issues
from the wheel is increased with the velocity of the wheel, and also
the velocity of the water is increased when the motion of the wheel is
diminished by its load.

Your inventor presumes that he will be excused from making a
more particular investigation, by saying that in [illegible] 1816, he gave the
common reaction wheel the present form of buckets by making them
thin of wood and iron, instead of spiral segments, this was an improve-
ment as there was less action of resistance against the backside of
the buckets, they being only [illegible], sufficient to give a perpendic-
-tion to the discharging water shortly after; this became under a
patent from a person unknown to me. and I presume never explained
the principle, neither hath it ever been explained worth repeating here.
They discharge the water outward from the shaft the buckets secured
between two rims, with the shaft connected to one, And the
wheel which I have constructed and applied to my invention
have buckets as it were at right angles with the former which are
lie

X 6334 ler thus." the water may seem to act upon it by pressure from the whole
of the head, but it is only by reaction that the wheel moves.

This wheel which I have constructed for ease in making and permanency
of its parts may represent at a glancing view, that which was formerly called
a tub wheel except it has no arms, the buckets entering the shafts and
are supported in the rim, they lie very flat and very thin, their o-
edges which cut and leave the water, are made sharp by their obliquity
they scarf or lap over each other, and the space between them all is
called the throat, or opening of the wheel, they decline about three
or four inches to a foot of their width. for a wheel of four feet diame-
ter with seven buckets their width becomes about 15 inches at the
shaft and two feet at the rim; this rim then requires to be about
ten inches and ½ deep so as to extend one inch below the buckets,
and two inches above the paping a feather edge bar of iron through
with its thick edge resting against, and fair with the bucket as a
cutter one end being drove well into the shaft the other end bent down
and supported under a hoop which binds the rim and wheel. which thus
a concave form at its upper side, and is nearly flat at its bottom, it has
a shaft for its support commonly of half the diameter of the wheel, where
the spiral mortices are made small portions of the wood are left to
support its short end. the buckets being slit to fit the same, if the
buckets were wholly of iron, plate or cast iron made smooth it would
be better although as it is requisite that the wheel should be always
under water. it is not subject to decay still for high heads, the wheels
should be made wholly of metal, with just proportion fair & smooth
as they become very small, hereafter one of such wheels will be
described. The next is the gudgeon: so much difficulty has attended this
point in the common reaction wheel as to render me objection to their
use, and although the wheels of my construction, have less weight
from their reduced size, still an improvement in the wearing part
is urgent, and that the wheel may be raised or lowered, adjusting
it for the draught by the same. Therefore gudgeons for large wheels
are made of wood and to be easily managed above the wheel,
it

X6334 it is made of any convenient length say two feet and from four
to six inches square as the weight required, this stands in the shaft
with a thin tapering piece at two of its sides for its support. it is
also supported by being blocked down at one of its corners. these
weights using it be cramp; so that it never alters. its lower end at
its sides rests against a perfect square hoop made of plate iron, about
two inches wide, which is bedded and secured in the shaft as a
bushing. The thin ends of the above tapering pieces entering the same
for convenience on the nearest and right side, with the said
blocking on the same corner; a one view ~~[illegible]~~ the gudgeon standing
in an open mortise above the wheel. this mortise is cut obliquely and
so large as to withdraw the gudgeon readily after the weight of the shaft
is removed from the said blocking, and for its security in wearing
commonly on greater part of the wood is proportionally removed from
near its centre, and more outward. The box for this gudgeon to wear
upon is commonly cast iron about one and ¼ inch thick with a
projecting edge to rest upon the wood, which is a floor or rather
a platform, made somewhat conical, and extends beyond the rim
of the wheel forming the lower part of the draught. the centre of this
platform is filled for the box as it hangs upon its edge, clear as that
surrounds its bottom. A 3/8 counter sink hole is made at one side
of the centre of the box, and the wood is scooped away from its bottom,
with a larger hole continued down through, that the water may rise.
For the wearing part it has circular concaves of the proportion of half
an inch deep for five inches face. this creates a tremulous motion
when necessary to inhale the water between the surfaces. This
system will not wholly apply only for upright shafts and for wheels
over two feet in diameter, referring to common fixtures for gudgeons
when otherwise, and to observe the above principle. Continuing to describe
the wheel and fixtures for applying [illegible] on principle. the wheel is now
supposed to stand upon its toe thus  with the lower part of its rim so
far above the platform as to give an opening between them equal
to twice that of the opening of the wheel (this may vary in some
cases cases, as for small wheels with high heads it may require more)
the inside of the lower corner of the rim is somewhat rounded
off between the buckets, and the lower part of the buckets are some
what above the edge of the rim, this space between them, and the
platform I call the bosom of the wheel, and that part of the platform
below the buckets, the breast of the wheel. the space between the
buckets and breast is about one fifth more than the measure of
that part of the opening above. This bosom makes part of the draught,
for furnishing the draught beyond the wheel a curbing of timber or other
material encircles the wheel and extends with even thickness and
level therewith, for common use about one foot; as for example,
If the bevel on the breast is two inches in twelve; and the wheel to be four
feet diameter, with two feet opening. then as directed 2X2=4 feet the
space requisite under the rim, which rim is 12 feet in circumference,
and the 4 feet X 12=48, which divided by the rim 12 is =4 inches for
its height above the breast, and its outer discharge extending
one foot beyond the wheel, and increases the opening or dis-
charge half as much more, that is six feet, and the bevel 2 in 12,
causes half as much more still to be added for the dis
charging space, which is now = 9 feet, and 9÷2=4½ or 4½ times as
long as the opening of the wheel; which having four feet head
or 16 feet velocity through it, then 16 by 4½ = 3 5/9 feet per second, or
equal to a head rather less than two inches lost in this application,
This extension of the draught may suffice for heads from one
to 33⅓ feet, or may easily be extended, that merely nothing is lost
yet small wheels have more than simple inverse advantage from
the same extent of the draught, in respect to the head lost, yet as
the bevel can be varied, and was it not for so many natural
forces to direct the water outward, the draught might be turned
downward even to accumulate great part of its force within
the same penstock. But every resistance from its natural
course, is a loss in the application. this syphon principle
demonstrating that if a confined penstock of [illegible] inches square
is is fitted under a head of water of 33⅓ feet and moved below the surface its gate then having the pressure 2083 lbs when shut, and if the gate is half opened it will then have the same pressure on the half gate, that it had on the whole surface, whilst it was shut for when the gate is half drawn the concussion of the issuing water repells the incumbent water from the lower side and produces a vacuum there, and if this half gate was allowed to move onward through the penstock, with half the natural velocity of the water, (or 23 feet per second) which is the same velocity which is given by ¼ of the head 33⅓ ÷ 4 = 8⅓ that is 8⅓ feet, it would then have the pressure exerted upon it, equal to ¾ of that which it had before it moved, which is ¾ of 2083 lbs or 1562¼ lbs moving this with half the velocity of the water, whilst the opening removed is but the half of 2083 or 1042 lbs, and if this gate was laid inclining to represent the buckets of the wheel, on which I apply this principle with the same effect. The above may suffice to show the reason why the wheel requires double resistance to stop its motion, than the whole amount of pressure removed by its openings. That is one half of the opening for the wheel, with this application produces equal effects to that which was established for the common reaction wheel, or with the same opening, produces double effect, as hereafter explained. The water acts upon the wheel by its whole head, & whatever may be its velocity in directing it into the flume (surrounding the wheel) its motion should be the same, way which the wheel may move, as from the opening being directed to that side of the shaft to give this motion round the shaft, and if the wheel is within a penstock where the water descends to it, which fixtures set spirally should be affixed to its sides to give this direction, this securely prevents a whirlpool which would otherwise destroy the action; and also has other proper effects, for preventing waste of water outside of the rim a separate stiff rim is placed upon the curbing timber and X633i and covering the rim of the wheel its innermost edge complying therewith, and having thin warped wood nailed so as to extend down to near the ladles or buckets. The wheel is supposed to be turned off by its motion in that part. The wheels should have a small diameter merely sufficient to emit the requisite quantity of water, there is assurance that its small surface and weight with increased velocity at its centre running, all tend to diminish friction, and the water acts upon it with equal force, yet some increase its size the building become more flat for convenience. having one wheel of good form, the diameter of another, with different openings, may be found from the square of the diameter of the given wheel more or less as the proportion of their openings may be the square root of the product is the diameter of the required wheel, to apply different powers with different heads; the quantity of water or rather the power to be used, must be estimated by some other power, such as that of a millstone of four feet diameter, requiring 200 lbs to be constantly exerted at a point two feet from its centre where the velocity is 20 feet per second, then 200 × 20 is = 4000 lbs is raised one foot per second by that power, and for two pairs it would be 8000 lbs, one foot high per 1''. and the weight of a cubic foot of water is 62½ lbs, which × by the whole head in feet gives the pressure on one foot of surface, or opening removed, and from this foot, more or less, as the opening of the wheel may be, to which add half as much more for the maximum load. this being multiplied by half the velocity of the water per second in feet, gives the effect, and in the comparison of the above. The velocity of the water per second divided by 8, gives the square √ of its head & the square root of its head × 8 is its velocity per second in feet. Then if the wheel had 16 feet head applied with 2 feet opening its effect would be stated as follows [illegible], add ½ and × by 2, the opening, the product is 3000 or = 1½ millstones, and its centre of action being

[illegible] XG336 being 132 inches or 11 feet circumference it revolves [illegible] per
second or 437 per minute, or in other words the artificial
pressure is equal to 93¾ lbs for every square foot of opening
in the wheel, which multiplied by the head in feet, the
product is the maximum load of the wheel, and this
multiplied by half the velocity per second; gives the effect
or number of lbs, that can be raised one foot per second
example if 33⅓ head, was applied to this wheel, then 93¾
lbs. X by 2 = 197½ X by 33⅓ = 6250 lbs, the maximum pressure, at
the centre of the buckets, which being X by ½ the velocity per
second = 23 feet, gives 143750 lbs, that can be raised &c.
this divided by 4000, gives near 36 millstones, or if divided
by 300, it shews the horse power. And if it was required to
construct a wheel with this head, to be equal to the power of a mill
stone, 1/36 part of that opening = 255 inches, ie = [illegible] inches, we[?] to find
a proper diameter for this opening from the last wheel, it would be 4/[illegible] -
that is = to 60/36, the square root being 4/6 of a foot or = to 8 inches for the
diameter of the wheel, here four buckets would be proper of tinned
plate, measuring about 7 inches on the circle of the wheel, where they
are supported by a hoop made of plate about 2 inches wide and ¼ thick
its edge projecting above the buckets, about ¾ of an inch; this hoop
should be turned fair, especially within to receive the edge of an
another cylinder hoop, to enter properly within, to near the buckets
for preventing waste of water, its opposite part is secured to the
penstock, as the wheel is supposed to sit within one, and its shaft
to extend through the sides of the same observing that the shaft may
become 4½ or 5 inches diameter, for the support of the wheel, and other
parts of it, one inch, if the parts to be connected are first coated with tin it
may be soldered, and the corners formed to allow an easier turn for the
water to prevent friction. Its maximum load 173 3/4 lbs, and revolves 12
times per second, or 720 per minute, is too swift to attempt its gearing
with common cogs, and the motion is generally swift, with this
application, although we should reduce the driving wheel to six

X6336 six or seven inches diameter. it will often be difficult to gear
from this, it may seem proper to describe a new form of gearing
which I have introduced for saving expense and preventing
friction by making thinner cogs with wide wearing. For the common
wheel or gear requires 23 parts or joints for setting in each cog;
having two rims [illegible] which cannot well apply to my improve-
ment. Therefore the spur wheel is made wholly from large
timber, which is formed into sectional parts of the circle
of the wheel say 12, 18, 24 &c, pieces to have alike size and number of
cogs, on the end of each sectional piece. these pieces are made
wide as to give a great width to the cog; and also about two inches
to act as a rim, when turned off for meeting the other wheel, that
it may not jar from the pitch circle. A proportional part of them
extend into the shaft as arms having a shoulder at their under
edges which end is also slit by the saw, that it may be strained
to fill the mortise. the other parts are merely dowelled upon
these; and the wheel is supported by the iron hoop on each
side; these hoops are let into the wood several inches from
the outer edge of the wheel, and are drawn by a [illegible] and key.
216 cogs with one inch space may be had with 18 pieces; that is
12 cogs on each, or if 24 pieces 9 cogs on each. and for bevel
gear observe the same principle, but here the grain of the wood
becomes the same way with that of the shaft, and the wheel
is secured to arms which are moveable when new cogs are
required to be cut upon the same wheel, whilst the other
allows of adding a proportional piece between the parts
or joints to enlarge its diameter for the same purpose in
The substance of the hoop may vary with the size of the
wheels as from five eighths to one inch square, that it may
bear a heavy strain, when small wheels are when the driving
wheels are made of iron. the iron cog should be but half the
thickness of the wooden cog in its bearing wheel; the design is
to increase the number and surface of the cogs by making
them

X6336

[illegible] shorter which is done by turning off as —— and allowing the [illegible] a space between them & the auger is used for removing the wood.

Thus I have endeavoured to explain the principle, and how to use this invention where an additional artificial pressure is applied to the wheel increasing its effects by suction; which I call the Syphon principle, where the force of percussion of water as well as gravity is applied to repel the atmospheric pressure, which I claim as my invention, when applied to mill wheels; also the wheel and parts for applying the same according to this my specification.

Witnesses
John Davis 2
Samuel Blaisdell

William Tindall

Exd
Ch[illegible]

4052 [illegible]